(12) United States Patent
Murphy et al.

(10) Patent No.: US 9,854,493 B2
(45) Date of Patent: Dec. 26, 2017

(54) METHODS AND APPARATUS FOR VIRTUAL SOFT HANDOFF

(71) Applicant: Juniper Networks, Inc., Sunnyvale, CA (US)

(72) Inventors: James Murphy, Alameda, CA (US); Abhijit Choudhury, Cupertino, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 379 days.

(21) Appl. No.: 14/606,802

(22) Filed: Jan. 27, 2015

(65) Prior Publication Data

US 2015/0139193 A1    May 21, 2015

Related U.S. Application Data

(63) Continuation of application No. 13/472,802, filed on May 16, 2012, now Pat. No. 8,948,129.

(51) Int. Cl.
| | |
|---|---|
| *H04W 36/18* | (2009.01) |
| *H04L 12/46* | (2006.01) |
| *H04L 12/64* | (2006.01) |
| *H04W 40/36* | (2009.01) |
| *H04W 36/00* | (2009.01) |
| *H04W 36/14* | (2009.01) |

(52) U.S. Cl.
CPC ......... *H04W 36/18* (2013.01); *H04L 12/4633* (2013.01); *H04L 12/4641* (2013.01); *H04L 12/6418* (2013.01); *H04W 36/005* (2013.01); *H04W 36/0011* (2013.01); *H04W 36/14* (2013.01); *H04W 40/36* (2013.01)

(58) Field of Classification Search
None
See application file for complete search history.

(56) References Cited

U.S. PATENT DOCUMENTS

| | | | |
|---|---|---|---|
| 6,804,532 | B1 | 10/2004 | Moon et al. |
| 7,548,526 | B2 | 6/2009 | Oba et al. |

(Continued)

FOREIGN PATENT DOCUMENTS

| | | |
|---|---|---|
| CN | 1949742 | 4/2007 |

OTHER PUBLICATIONS

Office Action for Chinese Application No. 2013101486756, dated Sep. 2, 2015.

(Continued)

*Primary Examiner* — Kwang B Yao
*Assistant Examiner* — Adam Duda
(74) *Attorney, Agent, or Firm* — Cooley LLP (57) ABSTRACT

In some embodiments, a non-transitory processor-readable medium includes code to cause a processor to receive at a tunnel server, a data unit addressed to a communication device, and define, a first instance of the data unit and a second instance of the data unit. The first instance of the data unit is sent to the communication device via a first tunnel defined between at least the tunnel server and a first base station associated with a first network. The second instance of the data unit is sent to the communication device via a second tunnel defined between at least the tunnel server and a second base station associated with a second network. The second instance of the data unit is dropped by the communication device when the first instance of the data unit is received before the second instance of the data unit.

16 Claims, 4 Drawing Sheets

(56) References Cited

U.S. PATENT DOCUMENTS

2009/0185560 A1 7/2009 Venkatesan et al.
2010/0202344 A1 8/2010 Kawakami
2011/0078783 A1 3/2011 Duan et al.

OTHER PUBLICATIONS

Second Office Action for Chinese Application No. 2013101486756, dated May 10, 2016.
Extended Search Report for European Application No. 13163287.9, dated Nov. 13, 2013.
Yifei Wei, et al., "Experimental Study of Hierarchical Mobile IPv6 Handover Performance," Third Intl. Conf. on Pervasive Computing and Applications, 2008, ICPCA 2008, IEEE, Piscataway, NJ, Oct. 6, 2008, pp. 409-413.
3GPP, "3$^{rd}$ Generation Partnership Project; Technical Specification Group Services and Systems Aspects; Feasibility Study of Mobility between 3GPP-WLAN Interworking and 3GPP Systems (Release 8)," 3GPP TR 23.827, V 0.4.0 Sep. 1, 2007 pp. 1-46.
CISCO: "IOS GETVPN Solution Deployment Guide," Retrieved from the internet: URL: http://www.cisco.com/en/US/prod/collateral/iosswrel/ps6537/ps6586/ps6635/ps7180/deployment_uide_c07_554713.pdf, Printed in USA C07-554713-00, 08/09, 42 pages.
Wikipedia "System Architecture Evolution," Retrieved from the internet: URL: <http://en.wikipedia.org/wiki/System_Architecture_Evolution> [Retrieved on Apr. 9, 2012], 8 pages.
Wikipedia "GPRS Tunnelling Protocol," Retrieved from the internet: URL: <http://en.wikipedia.org/wiki/GPRS_Tunnelling_Protocol> [Retrieved on Apr. 9, 2012], 7 pages.
Wikipedia "Soft handover" Retrieved from the internet: URL: <http://en.wikipedia.org/wiki/Soft_handover> [Retrieved on Mar. 6, 2012], 2 pages.
HungJu Tze "Handoff between VoWLAN and Cellular," Dept. of Electrical and Computer Engineering, University of Toronto, Nov. 2004, 49 pages.
Jingyuan Zhang et al. "Cellular Networks," Retrieved from the Internet: URL: <http://www.site.uottawa.ca/~ivan/cellular.pdf, Jul. 18, 2005, pp. 654-663.
RFC 4364, "BGP/MPLS IP Virtual Private Networks (VPNs)," Feb. 2006, IETF, all pages.
Office Action for European Application No. 13163287.9, dated May 17, 2017.

METHODS AND APPARATUS FOR VIRTUAL SOFT HANDOFF

CROSS-REFERENCE TO RELATED APPLICATIONS

This application claims priority to and is a continuation of U.S. patent application Ser. No. 13/472,802, filed May 16, 2012 and entitled "Methods and Apparatus for Virtual Soft Handoff," which is incorporated herein by reference in its entirety.

BACKGROUND

Some embodiments described herein relate generally to methods and apparatus for implementing virtual soft handoff from one wireless interface to another wireless interface in wireless devices which can allow for efficient operation of applications including, for example, voice applications and video applications, with a high quality of service and with minimal or no disruptions in connectivity.

Wireless devices such as portable handsets have the ability to connect to multiple network interfaces having different layer-2 (L2) protocols. Such a wireless device can have for example an Institute of Electrical and Electronics Engineers Inc. (IEEE) 802.11 wireless interface, and a third generation mobile telecommunications (3G) or a fourth generation mobile telecommunications (4G) cellular interface. A robust wireless communication system for such a wireless device needs to maintain a high quality of service (QoS) with minimal or no disruptions in connectivity, for both voice applications and video applications. Additionally, wireless voice applications and video applications are typically implemented with internet protocol (IP) address preservation so that network features such as routing, basic firewall, traffic management, etc. can function properly.

To achieve a robust wireless communication system with high QoS, handoff within a wireless device from one wireless interface to another should typically be performed while maintaining a minimal level of QoS and minimal disruption of connectivity. Some known handoff techniques called "soft handoff" are employed today in cellular applications at a physical layer, whereby signals from multiple base stations are combined to create a more robust signal that can be recovered. Additionally, other known handoff techniques from a cellular interface to a Wireless Fidelity (WiFi) interface exist that can be classified as "hard handoff" techniques. Hard handoff techniques involve switching a device from being connected to a cellular network to being connected to a WiFi network at a given point in time.

Accordingly, a need exists for methods and apparatus for implementing a virtual soft handoff technique involving multiple different network connections. Moreover, a need exists to combine reception from multiple networks to ensure a more robust "virtual link" between the source device and the destination device during the handoff process between networks. Such methods and apparatus can help ensure a lossless handoff where both networks are used during the transition between the networks.

SUMMARY

In some embodiments, a non-transitory processor-readable medium includes code to cause a processor to receive at a tunnel server, a data unit addressed to a communication device, and define, a first instance of the data unit and a second instance of the data unit. The first instance of the data unit is sent to the communication device via a first tunnel defined between at least the tunnel server and a first base station associated with a first network. The second instance of the data unit is sent to the communication device via a second tunnel defined between at least the tunnel server and a second base station associated with a second network. The second instance of the data unit is dropped by the communication device when the first instance of the data unit is received before the second instance of the data unit.

DETAILED DESCRIPTION

In some embodiments, a non-transitory processor-readable medium includes code to cause a processor to receive at a tunnel server, a data unit addressed to a communication device, and define, based on the data unit, a first instance or copy of the data unit and a second instance or copy of the data unit. The first instance or copy of the data unit is sent to the communication device via a first tunnel defined between at least the tunnel server and a first base station associated with a first network, and operatively coupled to the communication device. The second instance or copy of the data unit is sent to the communication device via a second tunnel defined between at least the tunnel server and a second base station associated with a second network, and operatively coupled to the communication device. The second instance of the data unit is dropped by the communication device when the first instance of the data unit is received before the second instance of the data unit. Similarly, the first instance of the data unit is dropped by the communication device when the second instance of the data unit is received before the first instance of the data unit.

In some embodiments, a tunnel server can be configured to receive a data unit addressed to a communication device. The tunnel server can be, for example, a Virtual Private Network (VPN) tunnel server, a General Packet Radio Service Tunneling Protocol (GTP) tunnel server, an Internet Protocol Security (IPsec) tunnel server, a Generic Routing Encapsulation (GRE) tunnel server, an Internet Protocol in Internet Protocol (IP in IP) tunnel server, a Control and Provisioning of Wireless Access Points Protocol (CAPWAP) tunnel server, and/or the like. The communication device can be a server or host machine such as for example, a web server, an application server, a proxy server, a telnet server, a file transfer protocol (FTP) server, or a personal computing device such as a desktop computer, a laptop computer, a personal digital assistant (PDA), a standard mobile telephone, a tablet personal computer (PC), and/or so forth. The tunnel server can be configured to define, based on the data unit, a first instance or copy of the data unit and a second instance or copy of the data unit. In some embodiments, the tunnel server can be configured to send the first copy of the data unit to the communication device via a first tunnel defined between the tunnel server and the communication device, and including, traversing and/or passing through at least a portion of a first network having a first network type. The tunnel can be, for example, a Virtual Private Network (VPN) tunnel, a General Packet Radio Service Tunneling Protocol (GTP) tunnel, an Internet Protocol Security (IPsec) tunnel, an Internet Protocol in Internet Protocol (IP in IP) tunnel, a Control and Provisioning of Wireless Access Points Protocol (CAPWAP) tunnel, and/or the like. In some embodiments, the tunnel server can be configured to send the second copy of the data unit to the communication device via a second tunnel defined between the tunnel server and the communication device, and including, traversing and/or passing through at least a portion of a second network having a second network type which can be different from the first network type.

In some embodiments, the tunnel server can be configured to receive a first data unit having a first data type (e.g., voice data, textual data, video data, audio data, etc.), at a first time. The first data unit is addressed to the communication device. The tunnel server can define, based on the first data unit, a first instance or copy of the first data unit and a second instance or copy of the first data unit. The first instance or copy of the first data unit can be sent to the communication device via a first tunnel defined between the tunnel server and the communication device, and having at least a portion within a first network. The second instance or copy of the first data unit can be sent to the communication device via a second tunnel defined between the tunnel server and the communication device, and having at least a portion within a second network. In some embodiments, the tunnel server can be configured to receive a second data unit having a first data type (e.g., voice data, textual data, video data, audio data, etc.), at a second time. The second data unit is addressed to the communication device. The tunnel server can define, based on the second data unit, a first instance or copy of the second data unit and a second instance or copy of the second data unit. The first instance or copy of the second data unit can be sent to the communication device via the first tunnel defined between the tunnel server and the communication device, and having at least a portion within the first network. The second instance or copy of the second data unit can be sent to the communication device via the second tunnel defined between the tunnel server and the communication device, and having at least a portion within the second network. In such embodiments, the second time is after the first time and the second network is different from the first network. In such embodiments, the tunnel server can send data of different types to the communication device. Similarly, in some embodiments, the tunnel server can receive data of different types from the communication device via the first tunnel and the second tunnel.

As used in this specification, the singular forms "a," "an" and "the" include plural referents unless the context clearly dictates otherwise. Thus, for example, the term "a network" is intended to mean a single network or a combination of networks.

Figure 1:
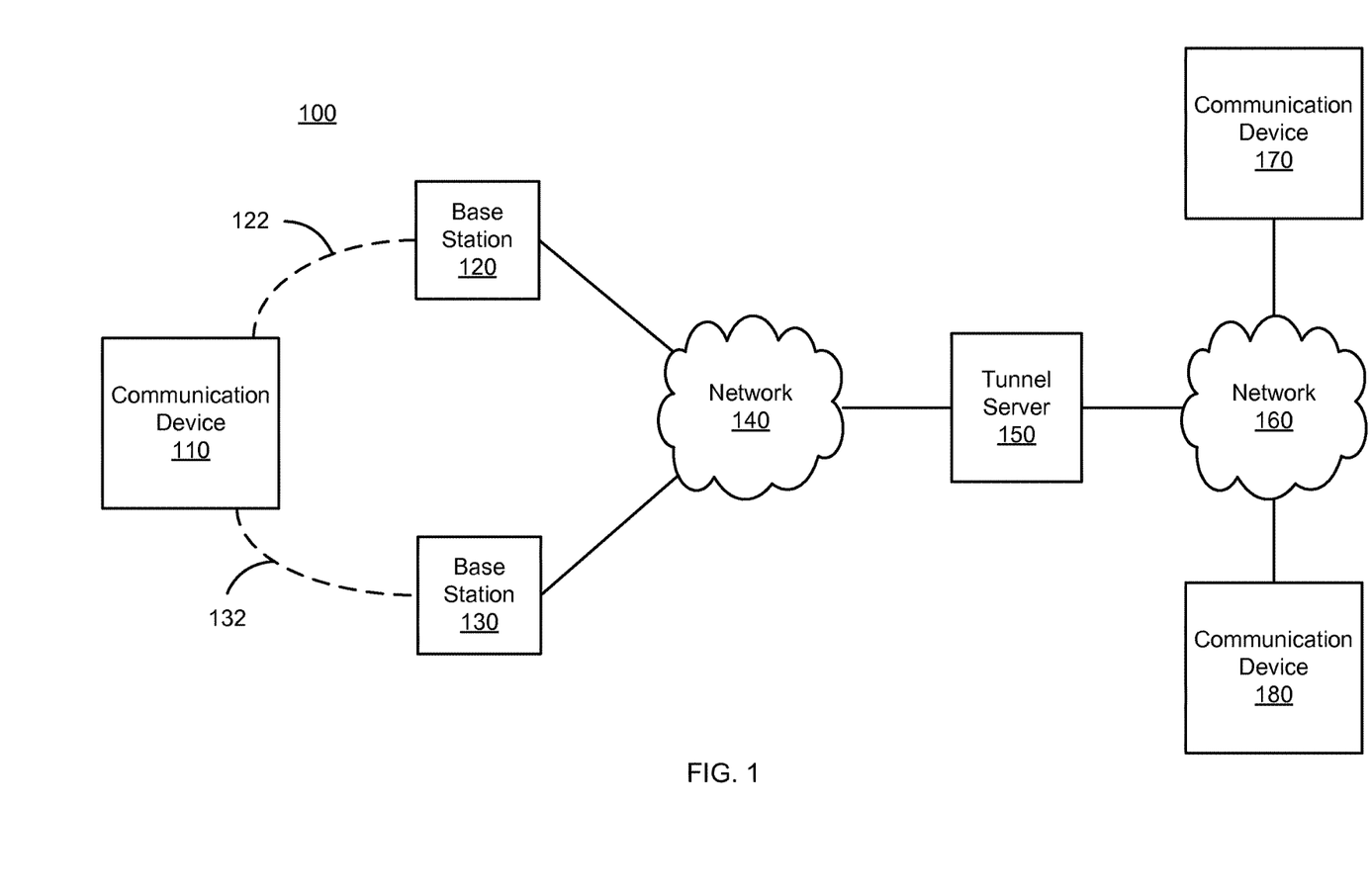
FIG. 1 is a schematic illustration of a virtual soft handoff system, according to an embodiment.

FIG. 1 is a schematic illustration of a virtual soft handoff system 100, according to an embodiment. In this embodiment, the virtual soft handoff system 100 is implemented in the tunnel mode. In the tunnel mode, a tunnel is established between the communication device and a tunnel server in the network. In such a mode, a virtual soft handoff process occurs between the communication device and the tunnel server. In the tunneling mode, the communication device can send and/or receive two tunneled copies of a specific data unit over two different interfaces. The mode of sending multiple copies of a data unit can take place over an existing WiFi and cellular network as long as the communication device can perform duplication and tunneling, and the tunnel server is present.

Referring to FIG. 1, the virtual soft handoff system 100 includes multiple communication devices 110, 170, 180; two base stations 120, 130; a tunnel server 150; and two networks 140 and 160. The networks 140 and 160 can be any type of network such as, for example, a local area network (LAN), a wide area network (WAN), a virtual network, a telecommunications network, implemented as a wired network and/or wireless network. The base station 120 can be operatively coupled to the communication device 110 via the communication link 122. The communication link 122 can be, for example, a WiFi connection, a Bluetooth connection a cellular connection operating according to a protocol such as 3G or 4G, or a wired connection such as an Ethernet or Digital Subscriber Line (DSL) connection. The base station 130 can be operatively coupled to the communication device 110 via the communication link 132. The communication link 132 can be, for example, a WiFi connection, a Bluetooth connection or a cellular connection operating according to a protocol such as 3G or 4G. The communication devices 110, 170 and 180 can be, for example, a server or host machine such as for example, a web server, an application server, a proxy server, a telnet server, a file transfer protocol (FTP) server, or a personal computing device such as a desktop computer, a laptop computer, a personal digital assistant (PDA), a standard mobile telephone, a tablet personal computer (PC), and/or so forth. The communication devices 170 and 180 can send a data unit to the communication device 110 via the tunnel server 150 and the networks 140 and 160. The communication devices 170 and 180 can receive a data unit from the communication device 110 via the networks 140 and 160 and the tunnel server 150.

As discussed further below, the communication device 110 can receive a first instance or copy of a data unit via a first base station 120 associated with a first tunnel defined between the tunnel server 150 and the communication device 110. The communication device 110 can also receive a second instance or copy of a data unit via a second base station 130 associated with a second tunnel defined between the tunnel server 150 and the communication device 110. The communication device 110 can send a first instance or copy of a data unit via a first base station 120 associated with a first tunnel defined between the communication device 110 and the tunnel server 150. The communication device 110 can also send a second instance or copy of a data unit via a second base station 120 associated with a second tunnel defined between the communication device 110 and the tunnel server 150.

In some embodiments, when the communication link 122 (or 132) between the communication device 110 and the base station 120 (or 130) is a WiFi link, the base station 120 (or 130) can be a WiFi access point, a Wi-Fi router, a Wi-Fi Array, a wireless local area network (WLAN), and/or the like. In other embodiments, the base station 120 (or 130) can be a cellular base station if the communication link 122 (or 132) between the communication device 110 and the base station 120 (or 130) is a cellular link. In such embodiments, the base station 120 (or 130) can be, for example, a Base Transceiver Station (BTS) or cell tower, and/or the like. In yet other embodiments, when the communication link 122 (or 132) between the communication device 110 and the base station 120 (or 130) is a wired link, the base station 120 (or 130) can be for example, a wired router, a wired switch (e.g., access switch), and/or the like.

The tunnel server 150 can be, for example, a Virtual Private Network (VPN) tunnel server, a General Packet Radio Service Tunneling Protocol (GTP) tunnel server, an Internet Protocol Security (IPsec) tunnel server, a Generic Routing Encapsulation (GRE) tunnel server, an Internet Protocol in Internet Protocol (IP in IP) tunnel server, a CAPWAP tunnel server and/or the like. In some embodiments, the tunnel server 150 can be a hybrid tunnel server that initiates and terminates tunnels of multiple kinds, e.g., GTP and GRE, or GTP and CAPWAP and/or the like. In some embodiments, the tunnel server 150 can be configured to receive a data unit from communication device 170 or 180. In such embodiments, the tunnel server 150 can duplicate the data unit to make a first instance or copy of the data unit and a second instance or copy of the data unit. Similarly stated, the tunnel server 150 can define, based on the data unit, a first instance or copy of the data unit and a second instance or copy of the data unit. For example, in some embodiments, the first instance can be the data unit received from the communication device 170 (or 180) and the second instance can be a substantially identical copy of the data unit received from the communication device 170 (or 180). The tunnel server 150 can also encapsulate each copy of the data unit with an individual tunnel header. The tunnel header can include the IP address of the source device and the IP address of the destination device, each of which identify as the "endpoints" of the tunnel. The tunnel header can also include information associated with the particular tunnel that is to be used to send the data unit such as, for example, a first tunnel associated with base station 120 and communication link 122, or a second tunnel associated with base station 130 and communication link 132. The tunnel server 150 can send the first copy of the data unit to the communication device 110 via the network 140, the base station 120, and communication link 122. In this case, the first copy of the encapsulated data unit can have a tunnel header including information associated with the first tunnel. The tunnel server can also send the second copy of the data unit to the communication device 110 via the network 140, the base station 130, and communication link 132. In this case, the second copy of the encapsulated data unit can have a tunnel header including information associated with the second tunnel.

Similar to sending data units to the communication device 110, the tunnel server 150 can also receive data units from the communication device 110. For example, the tunnel server 150 can receive from the communication device 110, a first instance or copy of a data unit at a first time for the destination device 170 or 180, via the first tunnel defined between the communication device 110 and the tunnel server 150. The tunnel server 150 can receive from the communication device 110, a second instance or copy of a data unit at a second time for the destination device 170 or 180, via the second tunnel defined between the communication device 110 and the tunnel server 150, the second tunnel being different than the first tunnel. In such instances, the tunnel server 150 can be configured to disregard and/or drop the second copy of the data unit when the second time is after the first time, decapsulate the first copy of the data unit and send the data payload associated with the first copy of the data unit to the destination device 170 or 180 based on the destination address of the first data unit. Similarly, the tunnel server 150 can be configured to disregard and/or drop the first copy of the data unit when the first time is after the second time, decapsulate the second copy of the data unit and send the data payload associated with the second copy of the data unit to the destination device 170 or 180 based on the destination address of the second data unit.

Typically, a mobile wireless communication device such as, for example, a standard mobile telephone or a tablet personal computer (PC) can include an IEEE 802.11 wireless interface and a 3G or 4G cellular interface. Successful operation of applications such as, for example, voice applications and video applications on mobile wireless communication devices can involve maintaining a high quality of service (QoS) with minimal or no disruptions in connectivity through a handoff process that changes which wireless interface is operative from one wireless interface to another. The handoff process can use virtual soft handoff, and can use cellular base stations and WiFi access points to combine receptions to define a more robust "virtual link" between the source device and the destination communication device during the handoff process. Virtual soft handoff can typically be implemented independent of the type of wireless network. Note that a communication device 110 can enter a virtual soft handoff mode when an application has indicated that a session is in progress (such as a voice call) and under the following conditions: (i) when a new WiFi interface is initiated and the communication device 110 is currently connected to a cellular network; and/or (ii) when an existing wireless interface experiences poor QoS and another wireless interface (e.g., WiFi or cellular) is available. A communication device 110 can exit the virtual soft handoff mode when: (i) only one interface is available; and/or (ii) when multiple interfaces are available and only one interface shows adequate QoS. If all interfaces show adequate QoS, an interface can be chosen according to a pre-determined policy, for example, selecting a WiFi interface rather than a cellular interface. QoS can be characterized, for example, by metrics such as the data unit loss rate, data unit latency, and/or data unit jitter. The tunnel header in the encapsulated data unit can include, for example, a sequence number and a timestamp to support the generation of values for these metrics, as described below.

Note that in other embodiments, the virtual soft handoff system 100 can be implemented in a native mode that can be used efficiently in the case of single operator for the two networks involved (e.g., a WiFi network and a cellular network). In the native mode, the base stations and tunnel servers can be in communication with each other. For example, control signals can be sent between the base stations and tunnel servers. The compute device 110 can duplicate the data units to be transmitted and can send the data units over both multiple interfaces (e.g., cellular and WiFi) without tunneling to the two base stations 120 and 130. In such instances, an entry in the header of the two data units can indicate the sequence number used for identifying the data units. The two base stations 120 and 130 can then tunnel the data units to a central point such as, for example, a tunnel server that is stand-alone or combined with a gateway, and the virtual soft handoff process can occur. In this mode, the base stations and tunnel servers involved can be designed to perform the virtual soft handoff. In some embodiments, the base stations 120 and 130 and tunnel server 150 can communicate with each other to co-ordinate the handoff process. In such embodiments, the base stations 120 and 130 and/or the tunnel server 150 can be from the same network operator and/or vendor.

The native mode of virtual soft handoff can be implemented using a General Packet Radio Service Tunneling Protocol (GTP) instead of a VPN tunneling protocol, and can include a Packet Data Network Gateway (PGW) instead of a VPN tunnel server. In such embodiments, data units can be sent from the source device to a first GTP interface of the PGW via a WiFi communications link (e.g., a WiFi router or access point) and a Serving Gateway (SGW). Additionally, in such embodiments, data units can also be sent from the source device to a second GTP interface of the PGW via a cellular communications link (e.g., via a cell tower) and using S2a Mobility Based on GTP (SaMOG). In some instances, the data units sent to the PGW from the source device are not encapsulated with a tunnel header. In such embodiments, the destination device IP address in a header of the data unit can be used to direct the data unit from the source device to the PGW. In other instances, the data units sent from the source device to the PGW can be sent to the PGW at least partially through a tunnel. For example, the data units can be sent from the source device to the SGW and SaMOG without tunneling, and via a tunnel from the SGW and/or SaMOG to the PGW. The PGW can then forward a data unit received from the source device to a destination device using the destination device IP address. In some embodiments, a sequence number can be used to determine which data unit to forward and which data unit to drop and/or disregard.

When a communication device 110 exits the virtual soft handoff mode, the communication device 110 enters a standard operation mode. In instances when a communication device 110 operates in the standard operation mode, duplication of outgoing data units by the communication device 110 (and/or the tunnel server 150) does not occur. Additionally, in the standard operation mode, a communication device 110 may or may not encapsulate the outgoing data unit depending on whether the communication between the source device and destination device is taking place through a secure network(s). In instances where the communication is taking place through an unsecure network(s), a tunnel such as, for example, a VPN tunnel, a GTP tunnel, an (HTTP) tunnel etc., can be used to send data units from the source device to the destination device. In such instances, the communication can send data units to tunnel server 150, and both the tunnel server 150 and the communication device 110 can encapsulate outgoing data units and decapsulate incoming encapsulated data units.

Note some embodiments of a virtual soft handoff system described herein are application independent and can work with voice applications, video applications and other data applications. Such virtual soft handoff systems can also be network-provider neutral and need not require coordination with the network-provider, but instead can use connectivity to an IP interface. Additionally, such virtual soft handoff systems can be L2 agnostic because they are executed at the IP layer, and can execute over any L2 interface including wired interfaces if available, without special knowledge of L2 protocols. Such virtual soft handoff systems can be implemented over existing IP networks, and can operate with L2-specific technologies such as admission control and other QoS mechanisms.

In some embodiments, the virtual soft handoff system is not limited to wireless access technologies. In such embodiments, the same virtual soft handoff system can be extended to any two disparate and/or similar technologies such as, for example, a wired connection and WiFi connection, a lossy wired connection over Digital Subscriber Line (DSL) across the Internet and a 4G wireless connection, and/or the like. While shown in FIG. 1 as having two tunnels from the tunnel server to the communication device, in other embodiments the virtual soft handoff system 100 can include any number and/or combination of tunnels from the tunnel server to the communication device.

In some embodiments, the data units sent between the communication device 110 and the tunnel server 150 can include data of any suitable data type. In some embodiments, for example, the data units can include voice data, textual data, video data, audio data and/or the like. Additionally, in some embodiments, a first data unit sent between the communication device 110 and the tunnel server 150 can data of a first type (e.g., voice data) while a second data unit sent between the communication device 110 and the tunnel server 150 can include data of a second type (e.g., video data) different than the first type. As described above and in further detail herein, multiple instances and/or copies of the first data unit and/or the second data unit can be sent between the communication device 110 and the tunnel server 150 via one or more tunnels.

Figure 2:
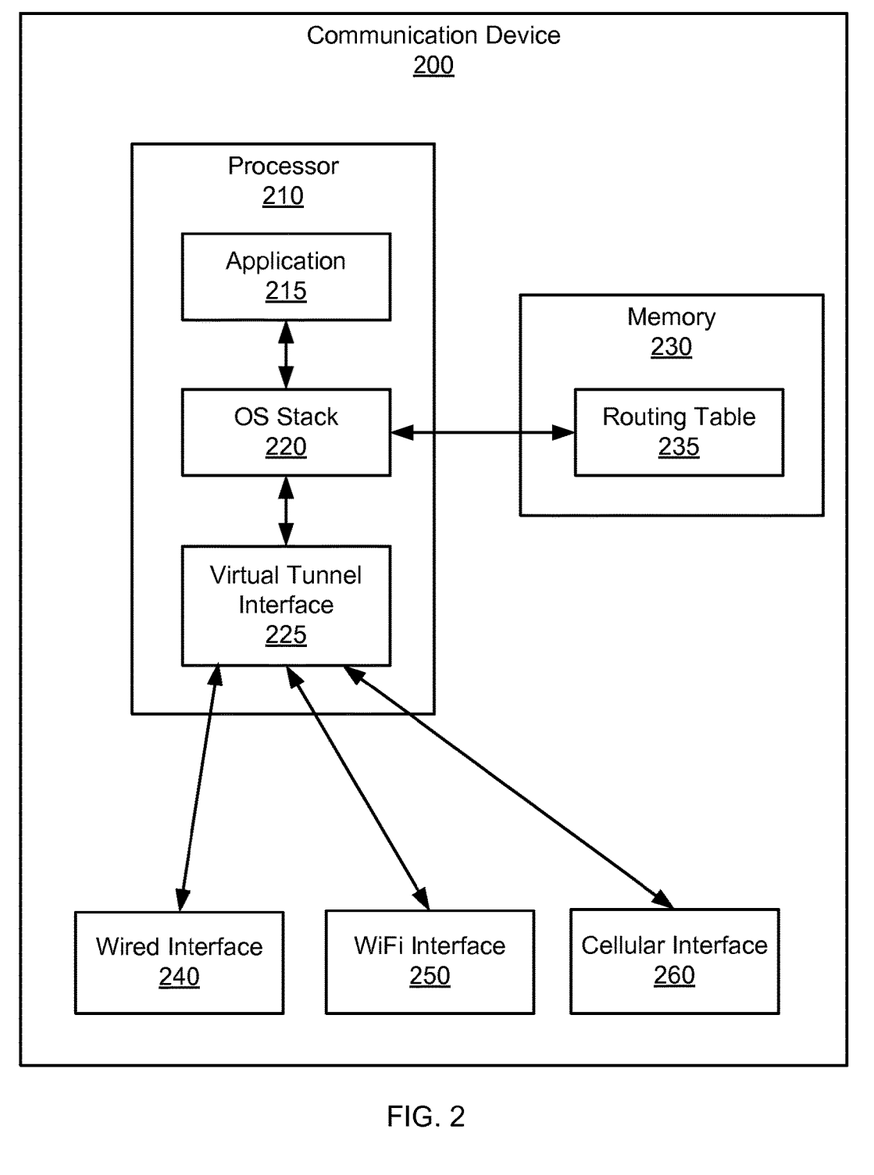
FIG. 2 is a system block diagram of a communication device, according to an embodiment.

FIG. 2 is a system block diagram of a communication device 200 similar to the communication device 110. The communication device 200 includes a processor 210, a memory 230, a wired interface 240, a WiFi interface 250, and a cellular interface 260. The processor 210 is operatively coupled to the memory 230, the wired interface 240, the WiFi interface 250, and the cellular interface 260. The processor 210 can be, for example, a general purpose processor, a Field Programmable Gate Array (FPGA), an Application Specific Integrated Circuit (ASIC), a Digital Signal Processor (DSP), and/or the like. The processor 210 can be configured to run and/or execute application processes and/or other modules, processes and/or functions associated with the virtual soft handoff system 100. The processor 210 includes an application 215, an operating system (OS) stack 220, and a virtual tunnel interface 225. While shown in FIG. 1 as having a single wired interface, a single WiFi interface, and a single cellular interface, in other embodiments the communication device 200 can include any number and/or combination of interfaces. For example, in some embodiments the communication device can include two cellular interfaces and a single WiFi interface. In other embodiments the communication device can include two WiFi interfaces and a single cellular interface. In yet other embodiments, the communication device can include one cellular interface, one WiFi interface and one Bluetooth interface.

The memory 230 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 230 can store instructions to cause the processor 210 to execute modules, processes and/or functions associated with the communication device 200 and the virtual soft handoff system 100. The memory 230 can include, for example, a routing table 235 associated with the communication device 200 of a virtual soft handoff system 100. The routing table 235 can be a database stored in the memory 230 of the communication device 200 that lists the routes to particular network destinations for outgoing data units. The routing table 235 can also list the distances associated with those projected destination routes for outgoing data units. The routing table 235 can also store route information (such as IP or Media Access Control (MAC) addresses of devices and/or interfaces) on directly connected and remote networks. Additionally, the routing table 235 can also contain "next hop" associations indicating an intermediate destination along an optimal path to the destination device. In some instances, the next hop association can be the WiFi interface or cellular interface of the destination device.

The application 215 can be a hardware module and/or software module (stored in memory 230 and/or executed in the processor 210) that causes the processor 210 to execute specific operations associated with the communication device 200 and the virtual soft handoff system 100. For example, the application 215 can be associated with a particular function in an enterprise such as an email application, an accounting application, a sales force application, a payroll application, and/or the like. The OS stack 220 can allocate and access the memory 230, and in some instances, can be used as a dedicated register to hold the current address of the stack pointer, as a dedicated memory space, and for preferential cache treatment. The OS stack 220 can also identify a route for an outgoing data unit from the routing table 235 based on the destination IP address of that data unit, and can send an indicator or identifier along with the data unit to the virtual tunnel interface 225, via the processor bus.

The virtual tunnel interface 225 secures the communication device 200 end of a tunnel by forming a tunnel between the communication device 200 and the tunnel server 150 (in FIG. 1), and encrypting the data traffic to be sent within the tunnel from the communication device 200. Referring to FIGS. 1 and 2, the virtual tunnel interface 225 can form a tunnel between the communication device 110 and the tunnel server 150 via the communication link 122 and the base station 120. The virtual tunnel interface 225 can also form a tunnel between the communication device 110 and the tunnel server 150 via the communication link 132 and the base station 130. The virtual tunnel interface 225 can duplicate each outgoing data unit (e.g., define at least two instances of the data unit), perform the tunnel header encapsulation (including the interface specific source IP address) of each outgoing data unit, and send a copy of each encapsulated data unit to each of the available WiFi interfaces 240 or 250, and/or the cellular interface 260.

The virtual tunnel interface 225 can also receive a first instance or copy of an incoming encapsulated data unit from the WiFi interface 240 or 250 at a first time, and receive a second instance or copy of an incoming encapsulated data unit from the cellular interface 260 at a second time, which is different from the first time. In such embodiments, the virtual tunnel interface 225 can disregard and/or drop the second copy of the data unit if the first copy of the data unit is received before the second copy of the data unit. Additionally, the virtual tunnel interface 225 can also disregard and/or drop the first copy of the data unit if the second copy of the data unit is received before the first copy of the data unit. Additionally, in such embodiments, the virtual tunnel interface 225 can decapsulate the accepted incoming data unit (that was not dropped) and deliver the data payload to the application 215.

The wired interface 240 connects the communication device 200 to a wired computer network. Referring to FIGS. 1 and 2, the wired interface 240 can receive a copy of an encapsulated outgoing data unit from the virtual tunnel interface 225 and can send that data unit to the base station 120 (or 130) associated with a wired communication link 122 (or 132). The wired interface 240 can also receive a copy of an encapsulated incoming data unit from the base station 120 (or 130) associated with a wired communication link 122 (or 132). In such situations, the base station 120 (or 130) can be a wired router, a switch (e.g., an access switch), and/or the like. In such instances, the wired interface 240 can send the encapsulated data unit to the virtual tunnel interface 225 for decapsulation and further processing.

The WiFi interface 250 connects the communication device 200 to a wireless computer network. Referring to FIGS. 1 and 2, the WiFi interface 250 can receive a copy of an encapsulated outgoing data unit from the virtual tunnel interface 225 and can send that data unit to the base station 120 (or 130) associated with a WiFi communication link 122 (or 132). The WiFi interface 250 can also receive a copy of an encapsulated incoming data unit from the base station 120 (or 130) associated with a WiFi communication link 122 (or 132). In such situations, the base station 120 (or 130) can be a WiFi access point such as an Apple AirPort Extreme Base Station, a wireless router such as a Wi-Fi router, a Wi-Fi Array, a wireless local area network (WLAN), and/or the like. In such instances, the WiFi interface 250 can send the encapsulated data unit to the virtual tunnel interface 225 for decapsulation and further processing.

The cellular interface 260 can connect the communication device 200 to a cellular network and can be, for example, a third generation mobile telecommunications (3G) interface, a fourth generation mobile telecommunications (4G) interface, a Global System for Mobile Communication (GSM) interface, and/or the like. Referring to FIGS. 1 and 2, the cellular interface 260 can receive a copy of an encapsulated outgoing data unit from the virtual tunnel interface 225 and can send the encapsulated data unit to the base station 120 (or 130) associated with a cellular communication link 122 (or 132). The cellular interface 260 can also receive a copy of an encapsulated incoming data unit from the base station 120 (or 130) associated with a cellular communication link 122 (or 132). In such instances, the base station 120 (or 130) can be a Base Transceiver Station (BTS) or cell tower, and/or the like. In such instances, the cellular interface 260 can send the encapsulated data unit to the virtual tunnel interface 225 for decapsulation and further processing.

Figure 3:
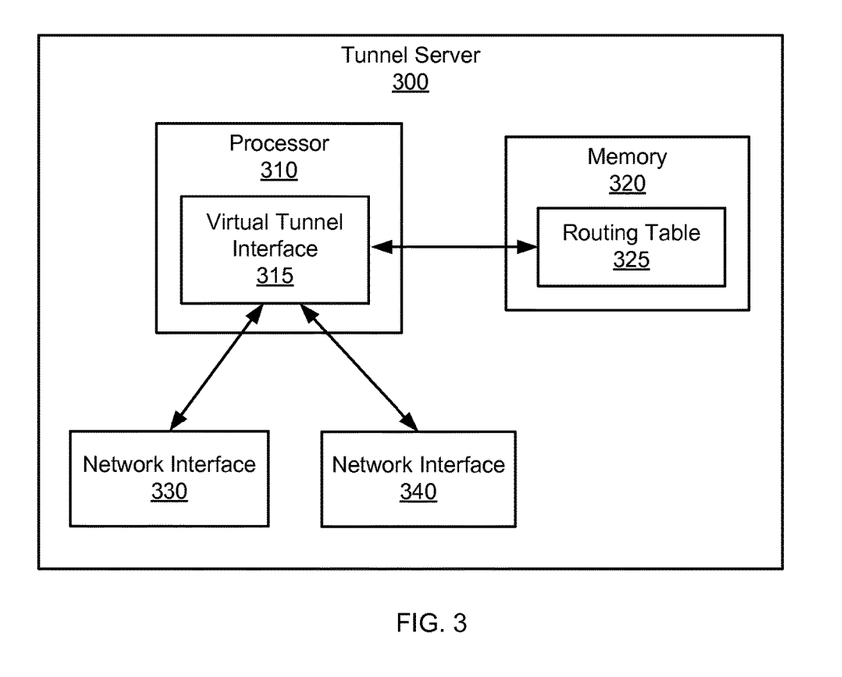
FIG. 3 is a system block diagram of a tunnel server, according to an embodiment.

FIG. 3 is a system block diagram of a tunnel server 300 similar to the tunnel server 150. The tunnel server 300 includes a processor 310, a memory 320, and network interfaces 330 and 340. Referring to FIGS. 1 and 3, the tunnel server 300 can receive data units from (or send data units to) communication device 110 and/or 170 and/or 180 via the network interfaces 330 and 340. The processor 310 can be, for example, a general purpose processor, a Field Programmable Gate Array (FPGA), an Application Specific Integrated Circuit (ASIC), a Digital Signal Processor (DSP), and/or the like. The processor 310 can be configured to run and/or execute application processes and/or other modules, processes and/or functions associated with the tunnel server 300 and the virtual soft handoff system 100.

The memory 320 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 320 can store instructions to cause the processor 310 to execute modules, processes and/or functions associated with operating the tunnel server 300 and the virtual soft handoff system 100. The memory 320 can include, for example, a routing table 325 associated with the tunnel server 300. The routing table 325 can be a database stored in the memory 320 of the tunnel server 300 that lists the routes to particular network destinations for outgoing data units. The routing table 325 can also list the distances associated with those projected destination routes for outgoing data units. The routing table 325 can store route information (such as IP or Media Access Control (MAC) addresses of devices and/or interfaces) on directly connected and remote networks. The routing table 325 can also contain "next hop" associations indicating an intermediate destination along an optimal path to the destination device.

The processor 310 includes a virtual tunnel interface 315. The virtual tunnel interface 315 can secure the tunnel server 300 endpoint of a virtual tunnel by forming a tunnel between the tunnel server 300 and the communication device 110, and encrypting the data traffic to be sent within the tunnel from the tunnel server 150. The virtual tunnel interface 315 can form a tunnel between the tunnel server 300 and communication device 110 via the communication link 122 and the base station 120. The virtual tunnel interface 315 can also form a tunnel between the tunnel server 300 and communication device 110, via the communication link 132 and the base station 130. In some embodiments, the virtual tunnel interface 315 can be configured to receive an indication that a signal strength and/or quality associated with a first WiFi network, a second WiFi network, or a cellular network has dropped below a pre-determined threshold level, and terminate the tunnel associated with the network based on the indication.

The virtual tunnel interface 315 can receive a data unit from communication device 170 or 180 that is destined for communication device 110, via the network interface 330 or 340. Upon receiving the data unit, the virtual tunnel interface 315 can duplicate the incoming data unit to produce a second copy of the data unit separate from the initially-received data unit, perform the tunnel header encapsulation (including the interface-specific source IP address) of the data unit, and send a first copy of the encapsulated data unit to the network interface 330 and a second copy of the encapsulated data unit to the network interface 340.

The virtual tunnel interface 315 can also receive a first instance or copy of an incoming data unit from communication device 110 destined for communication device 170 or 180 at a first time via a first tunnel (e.g., a tunnel formed between communication device 110 and the tunnel server 300 via communication link 122 and base station 120 as shown in FIG. 1). The virtual tunnel interface 315 can also receive a second instance or copy of an incoming data unit from communication device 110 destined for communication device 170 or 180 at a second time via a second tunnel, the second tunnel being different from the first tunnel (e.g., a tunnel formed between communication device 110 and the tunnel server 300 via communication link 132 and base station 130 as shown in FIG. 1). In such instances, the virtual tunnel interface 315 can disregard or drop the second copy of the incoming data unit when the second time is after the first time. In other instances, the virtual tunnel interface 315 can also disregard or drop the first copy of the incoming data unit when the first time is after the second time. This can be accomplished, for example, by including a sequence number in the tunnel header of the incoming data units. Thus, a packet with a duplicate sequence number arriving at the later time can be dropped. In such embodiments, the virtual tunnel interface 315 can decapsulate the tunnel header of the retained incoming data unit, identify the destination IP address of the destination device from the tunnel payload, encapsulate a new header on the payload to cause the encapsulated data unit to be switched or routed to communication device 170 or 180, and send this new payload to the network interface 330 or 340 associated with the destination IP address of the payload.

The network interface 330 and/or 340 can be, for example, a Wi-Fi interface, a Bluetooth interface, and/or the like. The network interface 330 and/or 340 can connect the tunnel server 300 to a computer network (140 and/or 160). In addition, the remaining network interface 330 and/or 340 can be a cellular network interface such as, a third generation mobile telecommunications (3G) interface, a fourth generation mobile telecommunications (4G) interface, a Global System for Mobile Communication (GSM) interface, and/or the like. Such network interface 330 and/or 340 can connect the tunnel server 300 to a cellular computer network (140 and/or 160). Referring to FIGS. 1 and 3, the network interface 330 or 340 can receive a copy of an encapsulated data unit from the virtual tunnel interface 315, and can send that encapsulated data unit to a router or switch in the network 140 associated with the "next hop" on the way to the destination device for that encapsulated data unit. The network interface 330 or 340 can also receive a copy of a non-encapsulated data unit (tunnel payload) from the virtual tunnel interface 315, and can be configured to send the non-encapsulated data unit to a router or switch in the network 160 associated with the "next hop" on the way to the destination device for the decapsulated data unit. The network interface 330 or 340 can also receive a non-encapsulated data unit from the communication device 170 or 180 destined for communication device 110, via the network 160. In such instances, the network interface 330 or 340 can send the non-encapsulated data unit to the virtual tunnel interface 315 for encapsulation and further processing.

Figure 4:
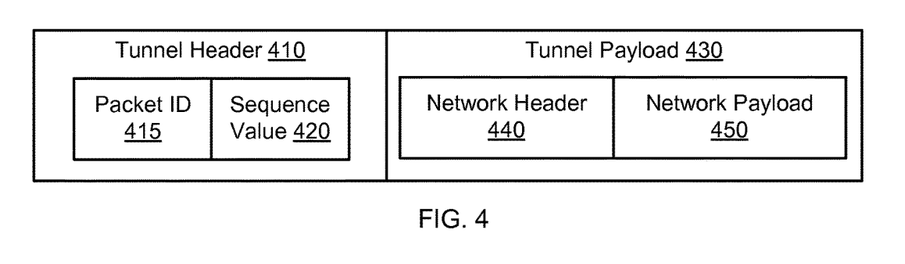
FIG. 4 is a block diagram of an encapsulated data unit, according to an embodiment.

FIG. 4 is a block diagram of an encapsulated data unit, according to an embodiment. The encapsulated data unit includes a tunnel header 410 and a tunnel payload 430. In some embodiments, the tunnel header 410 is the portion of the data unit that is added on to non-encapsulated data (tunnel payload 430) during encapsulation of the non-encapsulated data (tunnel payload 430) by the tunnel server 300 or the communication device 200, before the data unit is sent via a tunnel. For an encapsulated data unit, the tunnel header 410 is the portion of the encapsulated data unit that is removed by the tunnel server 300 or the communication device 200 during decapsulation of the encapsulated data unit as the encapsulated data unit is received via a tunnel. The tunnel header 410 includes a packet ID 415 and a sequence value 420. The packet ID 415 can include the IP address of the source device and the IP address of the destination device that identifies the "endpoints" of the tunnel. The sequence value 420 can be a monotonically increasing series of numbers that can identify data units. For example, data units with identical sequence values 420 are data units having the same data payload, and data units with non-identical sequence values 420 are different data units (i.e., data units having different data payloads). The tunnel server 300 or communication device 200 identifies the sequence value 420 of data units to determine whether to drop one of the received data units during implementation of virtual soft handoff. The tunnel payload 430 can be part of the data unit that is received at the tunnel server 300 from a communication device 170 or 180 before being encapsulated and sent into a tunnel by the tunnel server 300. In other instances, the tunnel payload 430 can be part of the data unit that is received at the virtual tunnel interface 225 (FIG. 2) of the communication device 200 in FIG. 2, before being encapsulated and sent into a tunnel by the virtual tunnel interface 225. The tunnel payload 430 includes a network header 440 and a network payload 450. The network header 440 can include the 5-tuple information associated with the tunnel payload 430 such as the source IP address, the destination IP address, the source port identifier, the destination port identifier, and the protocol used for data transfer. The network payload 450 contains, for example, an encrypted or unencrypted form of the data that is being sent from the source device to the destination device and can include, for example, a portion of an email message, a text message, and/or the like.

Figure 5:
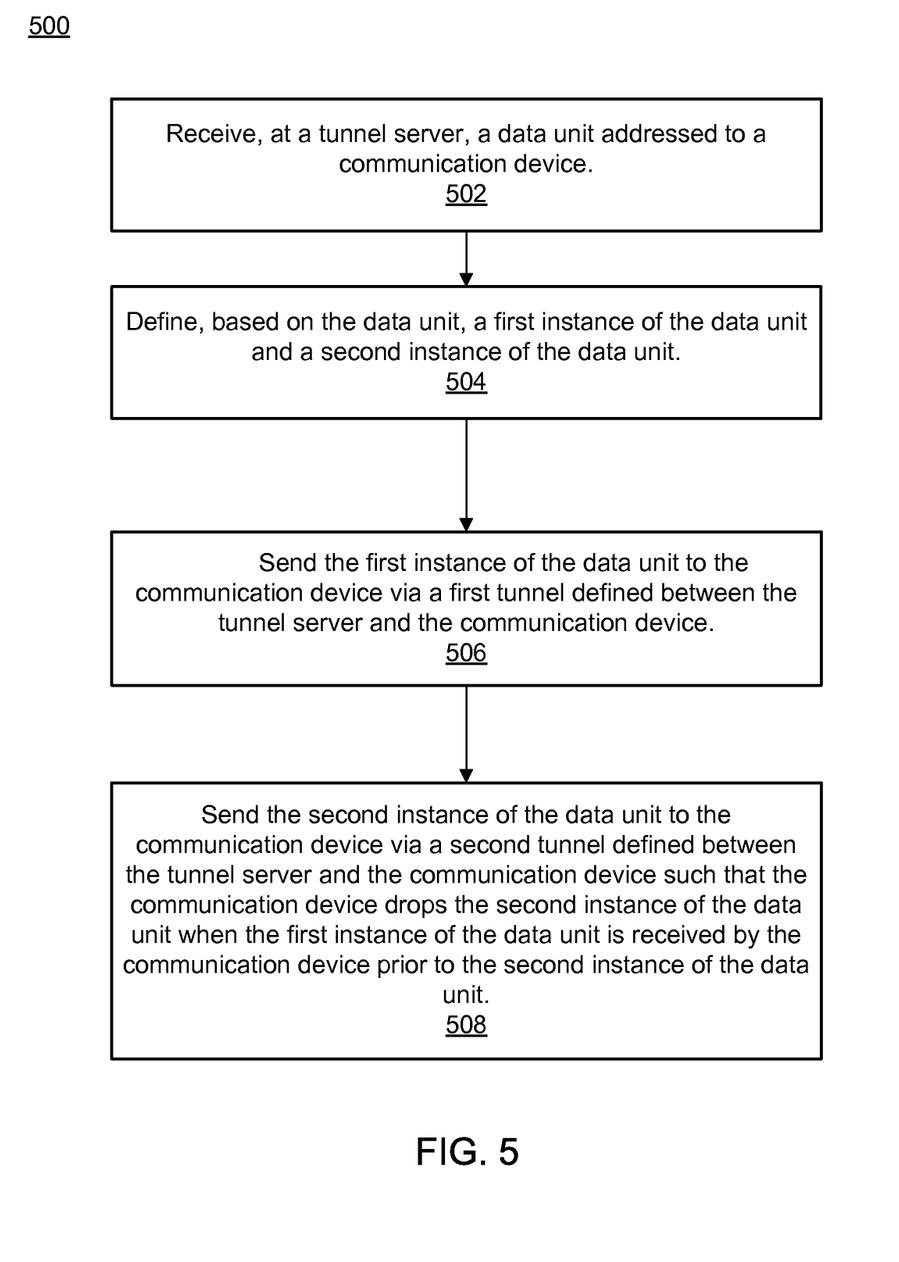
FIG. 5 is a flow chart illustrating a method of using virtual soft handoff to transfer data from a source device to a destination device, according to an embodiment.

FIG. 5 is a flow chart illustrating a method for virtual soft handoff to transfer data from a source device to a destination device, according to an embodiment. The method 500 includes receiving at, for example, a tunnel server, a data unit addressed to a communication device, at 502. The data unit can arrive at the tunnel server after being routed or switched through a network. As discussed above, the tunnel server can be, for example, a Virtual Private Network (VPN) tunnel server, a General Packet Radio Service Tunneling Protocol (GTP) tunnel server, an Internet Protocol Security (IPsec) tunnel server, a Generic Routing Encapsulation (GRE) tunnel server, an Internet Protocol in Internet Protocol (IP in IP) tunnel server, a CAPWAP tunnel server, and/or the like. Also as discussed above, the communication device can be a server or host machine such as, for example, a web server, an application server, a proxy server, a telnet server, a file transfer protocol (FTP) server, or a personal computing device such as a desktop computer, a laptop computer, a personal digital assistant (PDA), a standard mobile telephone, a tablet personal computer (PC), and/or so forth.

A first instance or copy of the data unit and a second instance or copy of the data unit are defined based on the data unit at, for example, the tunnel server, at 504. Each copy of the data unit can also be encapsulated with an individual tunnel header, to define the endpoints of a virtual tunnel by, for example, the tunnel server.

The first instance of the data unit can be sent by, for example, the tunnel server to the communication device via a first tunnel defined between the tunnel server and the communication device, at 506. As discussed above, the first tunnel can be based on a network such as, for example, a Wi-Fi network, a Bluetooth network, and/or the like. The first tunnel can alternatively be based on a cellular network such as, for example, a third generation mobile telecommunications (3G) network, a fourth generation mobile telecommunications (4G) network, a Global System for Mobile Communication (GSM) network, and/or the like.

The second instance or copy of the data unit can be sent by, for example, the tunnel server to the communication device via a second tunnel (which is different from the first tunnel) defined between the tunnel server and the communication device, at 508. As discussed above, the second tunnel can be based on a network such as, for example, a Wi-Fi network, a Bluetooth network, and/or the like. The second tunnel can alternatively be based on a cellular network such as, for example, a third generation mobile telecommunications (3G) network, a fourth generation mobile telecommunications (4G) network, a Global System for Mobile Communication (GSM) network, and/or the like. The communication device can disregard and/or drop the second instance of the data unit when the first instance of the data unit is received by the communication device prior to the second instance of the data unit. As discussed above, this can be accomplished, for example, by including a sequence number in the tunnel header of the incoming data units, whereby data units with identical sequence numbers (which indicates data units with identical data payload) arriving at the later time can be dropped.

Referring to FIGS. 1-3, while in virtual soft handoff mode, the virtual tunnel interface 225 on the communication device 200 and the virtual tunnel interface 315 on the tunnel server 300 can perform data unit duplication and data unit dropping functions. Furthermore, virtual tunnel interface 225 and 315 can also monitor the quality of the communication links 122 and 132 to determine when one of the tunnels can be terminated and/or dropped. For example, a tunnel is dropped when the tunnel's contribution to the improvement of the QoS of the session is negligible. This can be characterized by a tunnel whose delivery of data units represents a small fraction of total data units passed as payload to the destination communication device. In some embodiments, dropped or rejected tunnels can be retired after a pre-determined period if the QoS remains low during the period. Note that when a tunnel is dropped, the alternative interface remains active while the virtual tunnel interface 225 and 315 (i.e. on both the communication device 200 and tunnel server 300) can continuously scan for alternative networks as long as the session (such as a voice call or video conference call) remains active.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A non-transitory processor-readable medium storing code representing instructions to be executed by a processor, the code comprising code to cause the processor to:

receive, at a tunnel server, a data unit addressed to a communication device;

define, based on the data unit, a first instance of the data unit and a second instance of the data unit;

send, at a first time, the first instance of the data unit to a first base station via a first tunnel defined between the tunnel server and the first base station such that the first base station can remove a tunnel header associated with the first tunnel from the first instance of the data unit, the first base station being associated with a first network and operatively coupled to the communication device;

send, at a second time after the first time, the first instance of the data unit to the communication device; and send the second instance of the data unit to the communication device via a second tunnel defined between at least the tunnel server and a second base station associated with a second network different from the first network and operatively coupled to the communication device such that the communication device drops the second instance of the data unit when the first instance of the data unit is received by the communication device prior to the second instance of the data unit.

2. The non-transitory processor-readable medium of claim 1, wherein the first network is a cellular network, the second network is a WiFi network.

3. The non-transitory processor-readable medium of claim 1, wherein the first tunnel is associated with a virtual private network (VPN) connection between the communication device and the tunnel server.

4. The non-transitory processor-readable medium of claim 1, wherein the first instance of the data unit includes a sequence number associated with the data unit, the second instance of the data unit includes the sequence number.

5. The non-transitory processor-readable medium of claim 1, further comprising code to cause the processor to:
encapsulate the first instance of the data unit using a header associated with the first tunnel; and
encapsulate the second instance of the data unit in a header associated with the second tunnel.

6. The non-transitory processor-readable medium of claim 1, wherein the data unit is a first data unit, the code further comprising code to cause the processor to:
receive, at the tunnel server and at a third time, a first instance of a second data unit from the communication device via the first tunnel;
receive, at the tunnel server and at a fourth time, a second instance of the second data unit from the communication device via the second tunnel; and
drop the second instance of the second data unit when the fourth time is after the third time.

7. The non-transitory processor-readable medium of claim 1, wherein the data unit is a first data unit, the first data unit having a first data type, the code further comprising code to cause the processor to:
receive, at the tunnel server, a second data unit addressed to the communication device, the second data unit having a second data type different from the first data type;
define, based on the second data unit, a first instance of the second data unit and a second instance of the second data unit;
send the first instance of the second data: unit communication device via the first tunnel; and
send the second instance of the second data unit to the communication device via the second tunnel.

8. The non-transitory processor-readable medium of claim 1, further comprising code to cause the processor to:
receive an indication that a signal quality associated with the first network has crossed a threshold; and
terminate the first tunnel based on the indication.

9. The non-transitory processor-readable medium of claim 1, further comprising code to cause the processor to:
receive an indication that a signal quality associated with the second network has crossed a threshold; and
terminate the second tunnel based on the indication.

10. The non-transitory processor-readable medium of claim 1, wherein the first network is a wireless network, the second network is a wired network.

11. The non-transitory processor-readable medium of claim 1, wherein the first tunnel uses a first tunnel protocol, the second tunnel uses a second tunnel protocol different from the first tunnel protocol.

12. An apparatus, comprising:
a tunnel server configured to receive a data unit addressed to a communication device, the tunnel server configured to define, based on the data unit, a first instance of the data unit and a second instance of the data unit,
the tunnel server configured to send, at a first time, the first instance of the data unit to a first base station via a first tunnel defined between the tunnel server and the first base station such that the first base station removes a tunnel header associated with the first tunnel from the first instance of the data unit when the first instance of the data unit is received by the first base station, the first base station being associated with a first network and operatively coupled to the communication device,
the tunnel server configured to send, at a second time, the first instance of the data unit from the first base station to the communication device,
the tunnel server configured to send the second instance of the data unit to the communication device via a second tunnel (1) associated with a second network different from the first network and (2) defined between at least the tunnel server and the communication device such that the communication device drops the second instance of the data unit when the first instance of the data unit is received by the communication device.

13. The apparatus of claim 12, wherein at least one of the first tunnel or the second tunnel is associated with a virtual private network (VPN) connection between the communication device and the tunnel server.

14. The apparatus of claim 12, wherein the first instance of the data unit includes a sequence number associated with the data unit, the second instance of the data unit includes the sequence number.

15. The apparatus of claim 12, wherein the tunnel server is configured to receive an indication that a signal quality associated with the first network has crossed a threshold, the tunnel server configured to terminate the first tunnel based on the indication.

16. The apparatus of claim 12, wherein the tunnel server is configured to receive an indication that a signal quality associated with the second network has crossed a threshold, the tunnel server configured to terminate the second tunnel based on the indication.

* * * * *

UNITED STATES PATENT AND TRADEMARK OFFICE
CERTIFICATE OF CORRECTION

PATENT NO.        : 9,854,493 B2
APPLICATION NO.   : 14/606802
DATED             : December 26, 2017
INVENTOR(S)       : James Murphy et al.

Page 1 of 1

It is certified that error appears in the above-identified patent and that said Letters Patent is hereby corrected as shown below:

At Column 15, Line 62, (Claim number 7, Line number 12), "data: unit" should be --data unit to the--.

Signed and Sealed this
Fifteenth Day of May, 2018

Andrei Iancu
*Director of the United States Patent and Trademark Office*